(12) United States Patent
Yun et al.

(10) Patent No.: US 8,976,235 B2
(45) Date of Patent: Mar. 10, 2015

(54) DISPLAY APPARATUS

(75) Inventors: Hae-Young Yun, Suwon-si (KR);
Il-Yong Yoon, Bucheon-si (KR); Il-Joo Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 653 days.

(21) Appl. No.: 13/301,888

(22) Filed: Nov. 22, 2011

(65) Prior Publication Data

US 2012/0194510 A1 Aug. 2, 2012

(30) Foreign Application Priority Data

Jan. 28, 2011 (KR) .............................. 2011-0008980

(51) Int. Cl.
| H04N 13/04 | (2006.01) |
| G02B 27/22 | (2006.01) |
| G02B 3/06 | (2006.01) |
| G02B 3/08 | (2006.01) |
| H04N 13/02 | (2006.01) |

(52) U.S. Cl.
CPC .............. *G02B 27/2214* (2013.01); *G02B 3/06* (2013.01); *G02B 3/08* (2013.01); *H04N 13/0235* (2013.01); *H04N 13/0447* (2013.01); *H04N 13/0454* (2013.01)
USPC .......................................................... 348/59

(58) Field of Classification Search
CPC ........... G02B 27/2214; H04N 13/0235; H04N 13/0447
See application file for complete search history.

(56) References Cited

U.S. PATENT DOCUMENTS

| 7,714,946 | B2* | 5/2010 | Hong et al. ..................... 349/15 |
| 2003/0043262 | A1* | 3/2003 | Takemoto et al. .............. 348/46 |
| 2005/0018288 | A1* | 1/2005 | Redert ........................... 359/462 |
| 2009/0052027 | A1* | 2/2009 | Yamada et al. ................ 359/463 |
| 2009/0174700 | A1* | 7/2009 | Daiku ............................ 345/214 |
| 2010/0208152 | A1* | 8/2010 | Kim et al. ...................... 349/15 |
| 2011/0096071 | A1* | 4/2011 | Okamoto et al. ............. 345/419 |

FOREIGN PATENT DOCUMENTS

| KR | 1020090089694 A | 8/2009 |
| KR | 1020100009739 A | 1/2010 |

* cited by examiner

*Primary Examiner* — Dave Czekaj
*Assistant Examiner* — Md Haque
(74) *Attorney, Agent, or Firm* — Cantor Colburn LLP

(57) ABSTRACT

A display apparatus includes a controller which generates a control signal based on at least one of a two-dimensional image and a three-dimensional stereoscopic image inputted from an outside, a panel including a plurality of pixels, where the plurality of pixels is arranged along a first direction and along a second direction substantially perpendicular to the first direction and displays the three-dimensional stereoscopic image having a plurality of viewpoints different from each other in each frame, a lens part including a plurality of lens units, where the plurality of lens units is disposed over the panel overlapping the pixels along the first direction and having a plurality of focal points which shifts in each frame, and a light source which supplies light to the panel.

22 Claims, 13 Drawing Sheets

DISPLAY APPARATUS

This application claims priority to Korean Patent Application No. 2011-0008980, filed on Jan. 28, 2011, and all the benefits accruing therefrom under 35 U.S.C. §119, the content of which in its entirety is herein incorporated by reference.

BACKGROUND OF THE INVENTION (1) Field of the Invention

Exemplary embodiments of the present invention relate to a display apparatus. More particularly, exemplary embodiments of the present invention relate to a lenticular type of a display apparatus which displays a three-dimensional ("3D") stereoscopic image.

(2) Description of the Related Art

As demand for 3D stereoscopic images increases in various industrial fields, e.g., motion picture film and video game industries, a stereoscopic image display apparatus for displaying a 3D stereoscopic image has been improved. The stereoscopic image display apparatus displays the 3D stereoscopic image by providing two-dimensional ("2D") images different from each other to left and right eyes of an observer, respectively. Thus, the observer recognizes a pair of two different 2D images, and the pair of two different 2D images is mixed in the brain of the observer, such that the observer may perceive the 3D stereoscopic image.

The stereoscopic image display apparatus is typically classified into a stereoscopic type and an auto-stereoscopic type according to whether or not the observer wears special glasses. Generally, the auto-stereoscopic type such as a barrier type and a lenticular type, for example, may be used for a flat display apparatus.

In the barrier type, the light passing through the left pixel is inputted to the left eye and the light passing through the right pixel is inputted to the right eye by blocking and transmitting light passing through left and right pixels using a parallax barrier. Thus, the 3D stereoscopic image may be displayed. In the barrier type, the light is partially blocked, and thus brightness may be decreased.

In the lenticular type, the 3D stereoscopic image may be displayed by refracting the light passing through the left and right pixels using a lens. The brightness in the lenticular type may be greater than the brightness in the barrier type since most of the light passes through the lens. However, in the lenticular type, the resolution of the 3D stereoscopic image is substantially the same as the resolution of a flat image divided by the number of viewpoints, and thus the resolution may be decreased.

BRIEF SUMMARY OF THE INVENTION

Exemplary embodiments of the present invention provide a display apparatus capable of increasing the number of viewpoints in a three-dimensional ("3D") stereoscopic image.

According to an exemplary embodiment of the present invention, a display apparatus includes a controller which generates a control signal based on at least one of a two-dimensional ("2D") image and a 3D stereoscopic image inputted from an outside, a panel including a plurality of pixels, where the plurality of pixels is arranged along a first direction and along a second direction substantially perpendicular to the first direction and displays the three-dimensional stereoscopic image having a plurality of viewpoints different from each other in each frame, a lens part including a plurality of lens units, where the plurality of lens units is disposed over the panel overlapping the pixels along the first direction and having a plurality of focal points which shifts in each frame, and a light source which supplies light to the panel.

In an exemplary embodiment, each of the focal points of the lens units may shift along the first direction by a same distance in each frame.

In an exemplary embodiment, adjacent pixels of the pixels may display the 3D stereoscopic image having the viewpoints different from each other.

In an exemplary embodiment, when the display apparatus is driven at a speed twice a normal driving speed, each of the pixels may display an image having an odd-numbered viewpoint in an odd-numbered frame and an image having an even-numbered viewpoint in an even-numbered frame, and each of the focal points of the lens units may shift by a half of a pixel pitch with respect to each of the focal points of the lens units in the odd-numbered frame.

In an exemplary embodiment, the controller may sequentially provide a first image having the odd-numbered viewpoint, a second image having the odd-numbered viewpoint, a third image having the even-numbered viewpoint and a fourth image having the even-numbered viewpoint to the panel.

In an exemplary embodiment, the controller may sequentially provide a first image having the odd-numbered viewpoint, a black image, a second image having the even-numbered viewpoint and a black image to the panel.

In an exemplary embodiment, when the display apparatus is driven at a speed three times a normal driving speed, the pixels may include a red pixel, a green pixel and a blue pixel, the red, green and blue pixels may be alternately and repeatedly arranged, the red, green and blue pixels may be disposed adjacent to each other and sequentially display an image having substantially identical viewpoint in each frame, and each of the focal points of the lens units may shift by one pixel pitch in each frame at a first speed.

In an exemplary embodiment, the panel may further include a blocking pattern disposed between the pixels, and each of the focal points of the lens units may further shift by a width of the blocking pattern along the first direction.

In an exemplary embodiment, each of the focal points of the lens units may shift by the width of the blocking pattern at a second speed less than the first speed.

In an exemplary embodiment, the panel may further include a blocking pattern disposed between the pixels, and each of the lens units may vibrate in each frame.

In an exemplary embodiment, when the display apparatus is driven at a speed N times a normal driving speed, each of the pixels may display an image having an (N+n)-numbered viewpoint in a (J×N+n)-th frame, where N is a natural number, J is a frame number of 3D stereoscopic image, and n is an integer greater than or equal to zero and less than N−1, and each of the focal points of the lens units may shift by p/N, where p is a pixel pitch.

In an exemplary embodiment, the controller may include a lens controller which provides a lens driving signal to the lens part, where the lens driving signal shifts the plurality of focal points of the plurality of lens units, a panel controller which provides a panel driving signal to the panel, where an image is displayed based on the panel driving signal, and a light source controller which provides a light source driving signal to the light source, where the light source driving signal increases brightness of the light source when the 3D stereoscopic image is displayed.

In an exemplary embodiment, the lens controller may include a first lens controller which provides the lens driving signal to an upper portion of the lens units, and second lens controller which provides the lens driving signal to a lower portion of the lens units.

In an exemplary embodiment, the lens part may include a first substrate including a plurality of electrodes, where a driving voltage is applied to the plurality of electrodes such that the plurality of lens units has a refractive index distribution corresponding to a refractive index distribution of a Fresnel lens type, a second substrate including a common electrode disposed opposite to the electrodes, and a liquid crystal layer disposed between the first substrate and the second substrate.

In an exemplary embodiment, the electrodes may include a first electrode disposed on the first substrate and a second electrode disposed on the first electrode, and the first electrode and the second electrode are alternately arranged.

In an exemplary embodiment, the driving voltage may be asymmetrically applied to the first electrode and the second electrode.

In an exemplary embodiment, the panel may have a first side extending along the first direction and a second side extending along the second direction, where a length of the first side is greater than a length of the second side, and the lens units may be arranged along the first direction such that a longitudinal direction thereof is substantially parallel to the second side of the panel, or such that the longitudinal direction thereof is arranged to form an inclined angle with respect to the second side of the panel.

In an exemplary embodiment, the pixels may have a first side extending along the first direction and a second side extending along the second direction, and a length of the first side is less than a length of the second side.

In an exemplary embodiment, a total sum of a length of the second side of the pixels may be substantially the same as a length of a side of the panel which extends along the second direction.

In an exemplary embodiment, the pixels may be arranged in a matrix shape.

In an exemplary embodiment, the panel may include a gate line extending along the first direction. The light source may include a plurality of block units arranged along the first direction.

In an exemplary embodiment, the panel may include a gate line extending along the second direction. The light source may include a plurality of block units arranged along the second direction.

According to exemplary embodiments of the present invention, the number of viewpoints of the 3D stereoscopic image is increased, and moiré effect and crosstalk are substantially reduced or effectively prevented, such that display quality is substantially enhanced.

BRIEF DESCRIPTION OF THE DRAWINGS

The above and other aspects and features of the invention will become more apparent by describing in further detail exemplary embodiments thereof with reference to the accompanying drawings, in which.

DETAILED DESCRIPTION OF THE INVENTION

Figure 1:
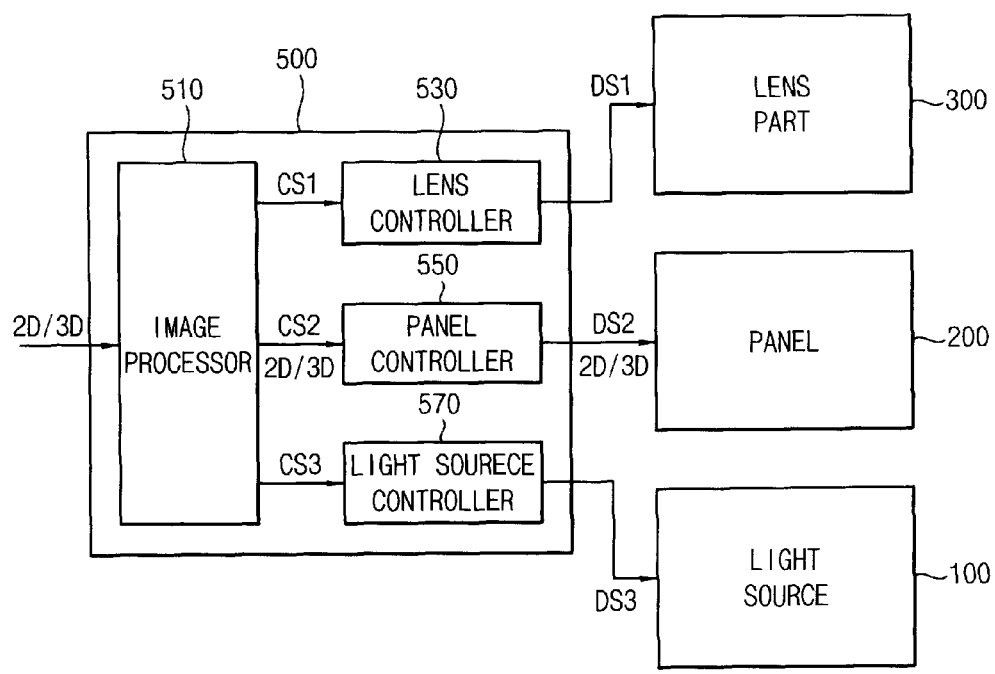
FIG. 1 is a block diagram illustrating an exemplary embodiment of a display apparatus according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be explained in detail with reference to the accompanying drawings.

Figure 2:
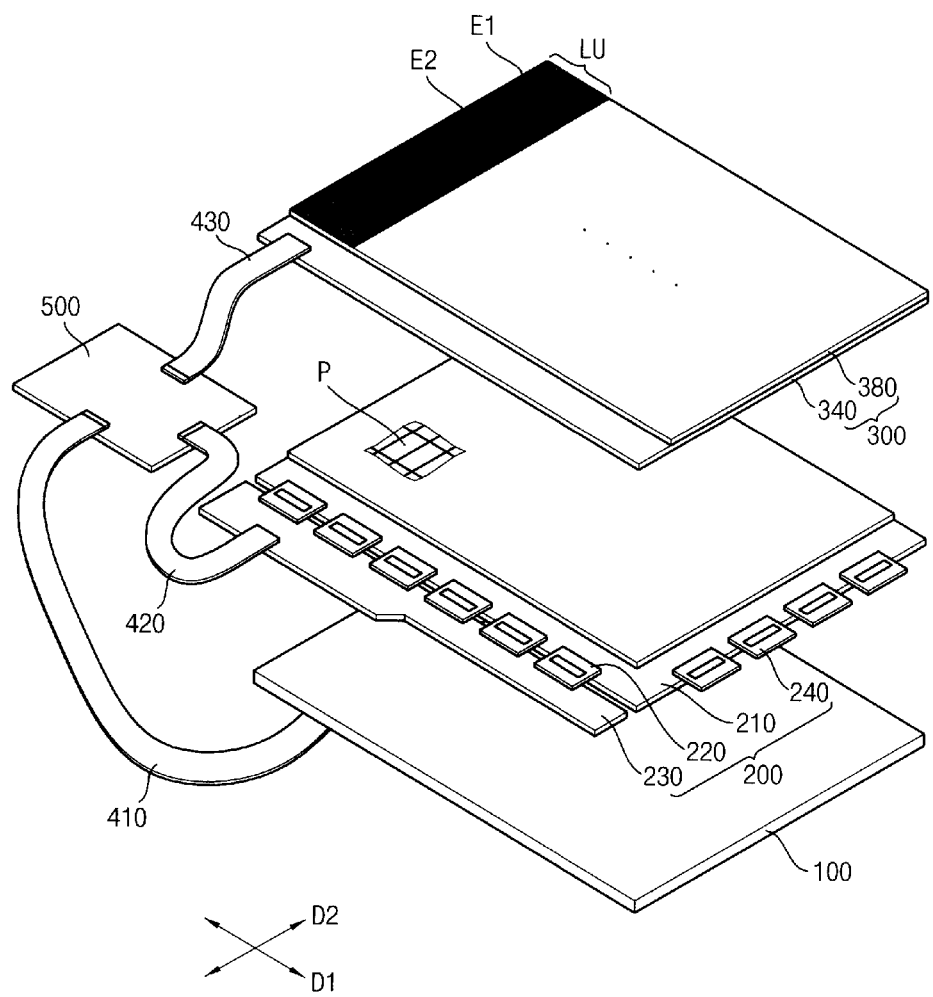
FIG. 2 is a perspective view of an exemplary embodiment of the display apparatus in FIG. 1.

FIG. 1 is a block diagram illustrating an exemplary embodiment of a display apparatus according to the present invention. FIG. 2 is a perspective view of an exemplary embodiment of the display apparatus in FIG. 1.

Referring to FIGS. 1 and 2, the display apparatus includes a light source 100, a panel 200, a lens part 300 and a controller 500.

The light source 100 emits light to the panel 200. The light source 100 includes a light source unit (not shown) for emitting the light. The light source unit may include a fluorescent lamp or a light emitting diode ("LED"). The light source 100 may be classified into a direct-illumination type light source or an edge-illumination type light source according to a position of the light source. In an exemplary embodiment, when the light source 100 is the edge-illumination type light source, the light source 100 may further include a light guide plate.

The panel 200 includes a display panel 210, a data circuit part 220, a source printed circuit board 230 and a gate circuit part 240. The display panel 210 includes a first side substantially parallel to a first direction D1 and a second side substantially parallel to a second direction D2 crossing the first direction D1. In an exemplary embodiment, the first side may be longer than the second side. The display panel 210 includes a plurality of pixels P.

The data circuit part 220 applies a data voltage to the pixels P, and is electrically connected to the source printed circuit board 230. The gate circuit part 240 outputs a gate signal to the pixels P. The gate signal controls a time of change in the data voltage. The gate circuit part 240 may be disposed, e.g., mounted, on the display panel 210 as a chip type, or directly integrated onto the display panel 210 with a thin film transistor, when the thin film transistor of the display panel 210 is provided on the display panel.

The lens part 300 includes a plurality of lens units LU. The lens part 300 includes a plurality of electrodes E1 and E2, a common electrode (not shown) disposed opposite to, e.g., facing, the electrodes E1 and E2, and a liquid crystal layer disposed between the electrodes E1 and E2 and the common electrode.

The electrodes E1 and E2 may extend along the second direction D2. When the lens units LU are corresponding to a Fresnel lens, the second direction D2 may be substantially parallel to an axial direction of the Fresnel lens. In an exemplary embodiment, the electrodes E1 and E2 receive continuously changing driving voltages and discontinuously changing driving voltages between the continuously changing driving voltages.

When the driving voltages are applied to the electrodes E1 and E2 and the common electrode, liquid crystal molecules in the liquid crystal layer are rearranged and thus have a refractive index distribution corresponding to a refractive index distribution of the Fresnel lens. In one exemplary embodiment, for example, the electrodes E1 and E2 that receive the continuously changing driving voltage are in an area corresponding to an arc of the Fresnel lens, and the electrodes E1 and E2 that receive the discontinuously changing driving voltage are in an area corresponding to an edge of the Fresnel lens. Accordingly, the lens part 300 is driven as the Fresnel lens.

The lens part 300 is driven in a two-dimensional ("2D") mode or a three-dimensional ("3D") mode. In one exemplary embodiment, for example, when the display apparatus displays a 2D image, the driving voltage is not applied to the lens part 300. Thus, the lens part 300 transmits light from the display panel 210 without refraction, such that an observer perceives the 2D image.

When the display apparatus display a 3D stereoscopic image, the driving voltage is applied to the lens part 300. Thus, the lens part 300 refracts the light from the display panel 210, such that the observer perceives the 3D stereoscopic image.

The controller 500 receives the 2D image 2D or the 3D stereoscopic image 3D from an outside, and controls the display apparatus to display the 2D image or the 3D stereoscopic image.

The controller 500 controls the pixels P to display the 3D stereoscopic image having different viewpoints in each frame, and controls the lens units of the lens part 300 to have different focal points in each frame. In addition, the controller 500 controls the light source 100 to be synchronized with the panel 200 and the lens part 300.

The controller 500 includes an image processor 510, a lens controller 530, a panel controller 550 and a light source controller 570. The controller 500 may further include a timing controller (not shown). The timing controller controls signals from the lens controller 530, the panel controller 550 and the light source controller 570, and outputs the signals.

The image processor 510 determines a mode of the display apparatus, e.g., the 2D mode or the 3D mode, based on the 2D image 2D or the 3D stereoscopic image 3D inputted thereto. The image processor 510 generates control signals based on the mode of the display apparatus.

The image processor 510 provides a first control signal CS1, a second control signal CS2 and a third control signal CS3 to the lens controller 530, the panel controller 550 and the light source controller 570, respectively.

In one exemplary embodiment, for example, the image processor 510 provides the first control signal CS1 to the lens controller 530. In one exemplary embodiment, for example, the first control signal CS1 may be a control signal that decides whether or not the lens part 300 drives as the Fresnel. In an exemplary embodiment, the lens part 300 is not driven as the Fresnel lens in the 2D mode, and the lens part 300 is driven as the Fresnel lens in the 3D mode.

The image processor 510 provides the second control signal CS2, the 2D image or the 3D stereoscopic image to the panel controller 550. In one exemplary embodiment, for example, the second control signal CS2 may be a control signal that decides whether or not the panel 200 displays the 3D stereoscopic image. In an exemplary embodiment, the panel 200 displays the 2D image in 2D mode, and the panel 200 displays the 3D stereoscopic image in 3D mode.

The image processor 510 provides the third control signal CS3 to the light source controller 570. In one exemplary embodiment, for example, the third control signal CS3 may be a control signal which determines brightness of the light source 100. In an exemplary embodiment, the light source controller 570 supplies the light with a first brightness in 2D mode, and the light source controller 570 supplies the light with a second brightness, which is greater than the first brightness in 3D mode.

The lens controller 530 provides a first driving signal DS1 based on the first control signal CS1 to the lens part 300. The first driving signal DS1 may include driving voltages which are provided to the lens part 300.

The first driving signal DS1 shifts each of the focal points of the lens units LU toward the first direction in each frame. A displacement of each of the focal points of the lens units LU may vary based on a driving speed of the display apparatus and a pixel pitch.

The panel controller 550 provides a second driving signal DS2, the 2D image or the 3D stereoscopic image based on the second control signal CS2 to the panel 200. The second driving signal DS2 may include a data voltage, a vertical start signal, a reverse signal and an output enable signal which are provided to the data circuit part 220. The second driving signal DS2 may also include a vertical start signal, a gate clock signal and an output enable signal which are provided to the gate circuit part 240.

When the 3D stereoscopic image is displayed, the pixels display different viewpoints in each continuous frame based on the second driving signal DS2. The 3D stereoscopic image displayed by the pixels P may be changed based on a number of viewpoints and a viewpoint number, which will be described in detail later.

The light source controller 570 provides a third driving signal DS3 based on the third control signal CS3 to the light source 100. In the 3D mode, the third driving signal DS3 may boost the brightness of the light source 100 to a first brightness greater than the second brightness of the light source 100 in the 2D mode.

The first driving signal DS1, the second driving signal DS2 and the third driving signal DS3 are synchronized with each other and are outputted.

The display apparatus may include a first connector 410 which electrically connects the controller 500 with the light source 100, a second connector 420 which electrically connects the controller 500 with the panel 200, and a third connector 430 which electrically connects the controller 500 with the lens part 300. Each of the first connector 410, the second connector 420 and the third connector 430 may be a flexible printed circuit board ("FPCB").

In an exemplary embodiment, the controller 500, the image processor 510, the lens controller 530, the panel controller 550 and the light source controller 570 are disposed on a same substrate. In an alternative exemplary embodiment, the controller 500, the image processor 510, the lens controller 530, the panel controller 550 and the light source controller 570 may be disposed on separate substrates.

Figure 3:
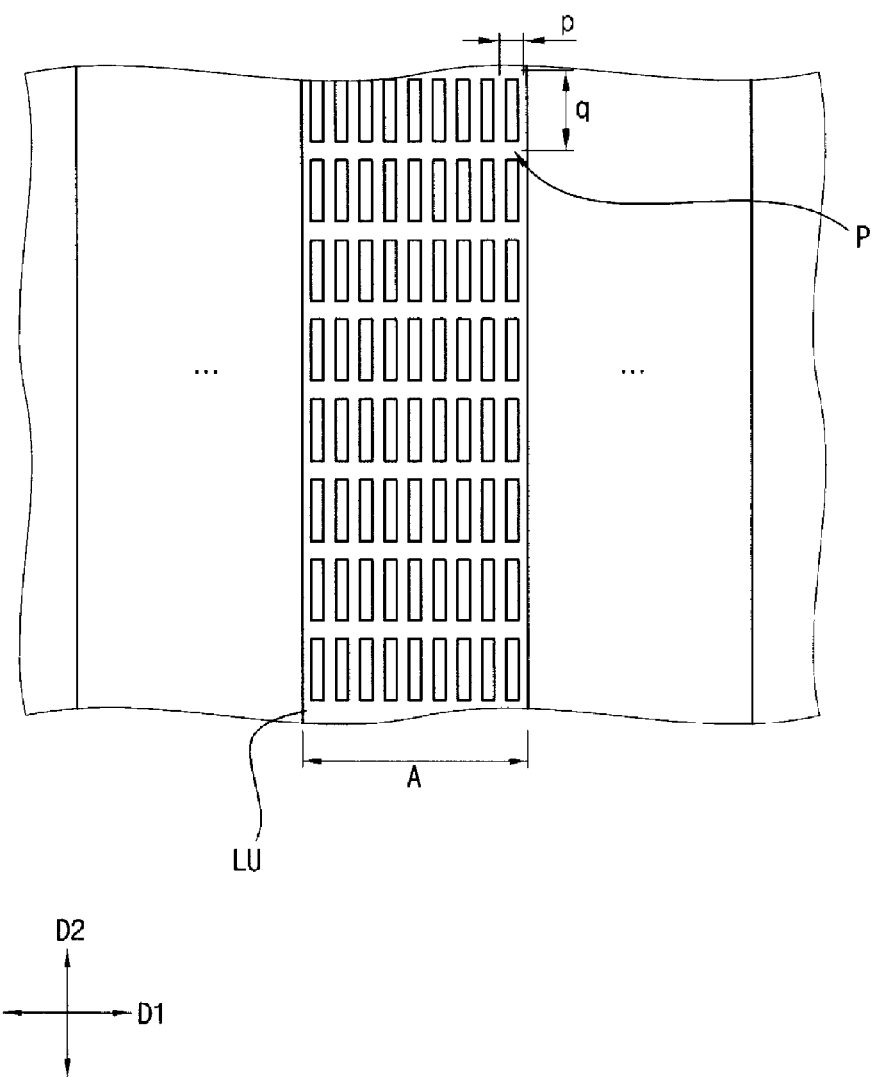
FIG. 3 is a plan view illustrating disposition of a panel and a lens part in FIG. 2.

FIG. 3 is a plan view illustrating disposition of the panel and the lens part in FIG. 2.

Referring to FIG. 3, the pixels P may have a first side extending along the first direction D1 and a second side extending along the second direction D2 and having a length greater than a length of the first side. In an exemplary embodiment, the pixels P may have a rectangular shape.

In an exemplary embodiment, the pixels P may be defined by signal lines or a blocking portion. Hereinafter, the signal lines or the blocking portion is referred to as a blocking pattern. The blocking pattern includes a plurality of first stripes extending along the first direction D1, and a plurality of second stripes extending along the second direction D2 and crossing the first stripes.

In an exemplary embodiment, a first pixel pitch p of the pixels P along the first direction D1 may be defined as a distance between centers of two adjacent stripes of the second stripes, and a second pixel pitch q of the pixels P along the second direction D2 may be defined as a distance between centers of two adjacent stripes of the first stripes.

In an alternative exemplary embodiment, the first pixel pitch p and the second pixel pitch q may be defined as a distance between centers of two adjacent pixels of the pixels P.

In an exemplary embodiment, the lens units LU extend along the second direction D2, and are disposed substantially parallel to each other along the first direction D1. Each of the lens units LU overlaps at least two pixels P arranged along the first direction D1. Each of the lens units LU has a lens pitch A of lens array, which is defined as length thereof in the first direction D1. The lens pitch A depends on the number of the pixels P overlapping each of the lens units LU. The lens pitch A may be substantially the same as a multiple of the number of the viewpoints along the first direction D1 and the pixel pitch p. In one exemplary embodiment, for example, the apparatus may display the image with 9 viewpoints and each of the lens units LU overlaps 9 pixels P. Accordingly, the lens pitch A may be nine times the pixel pitch p.

The pixels P are repeatedly arranged along the first direction D1 and the second direction D2. The pixels P may display a color by a thin film transistor substrate (not shown) of the display panel 210 or a color filer disposed on an opposite substrate (not shown). When the color filter includes filter units which display red, green and blue colors, the pixels P may be divided into a red pixel, a green pixel and a blue pixel, which displays red, green and blue colors, respectively.

The red pixel, the green pixel and the blue pixel may be sequentially and repeatedly arranged along the first direction D1. In addition, the red pixel, the green pixel and the blue pixel may be sequentially and repeatedly arranged along the second direction D2.

However, the pixels P may be arranged in various patterns. In one exemplary embodiment, for example, the pixels P that display the red, green, blue and green colors, respectively, may be sequentially and repeatedly arranged along the first direction. In an alternative exemplary embodiment, the pixels P that display red, green, blue and white colors, respectively, may be sequentially and repeatedly arranged along the first direction.

In an exemplary embodiment, the pixels P are arranged in a matrix shape. In an alternative exemplary embodiment, the length of the first side of the pixels P may be substantially the same as the length of the second side of the pixels P, and the pixels P may be arranged in a stripe shape along the second direction D2.

In an exemplary embodiment, an axis of the lens units LU is substantially parallel to the second direction D2. In an alternative exemplary embodiment, the axis of the lens units LU may be inclined with respect to the second direction D2.

Figure 4:
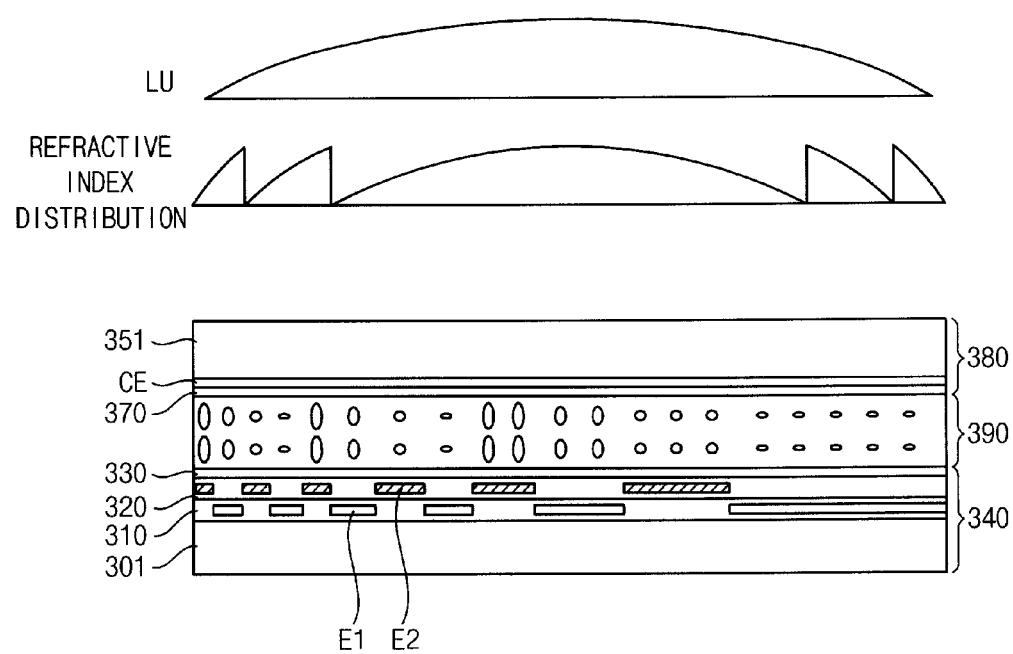
FIG. 4 is a cross-sectional view of an exemplary embodiment of the lens part in FIG. 2.
Figure 5:
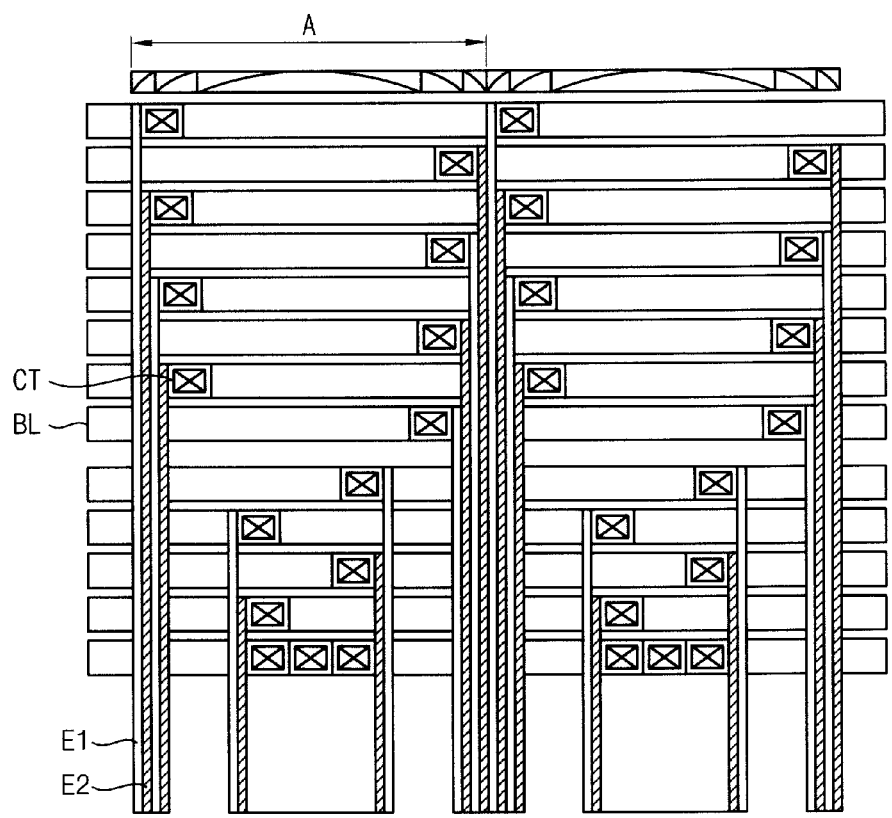
FIGS. 5 to 7 are plan views illustrating wiring schemes of an exemplary embodiment of the lens part in FIG. 2.
Figure 5:
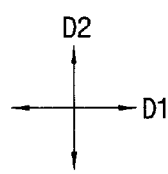
Figure 6:
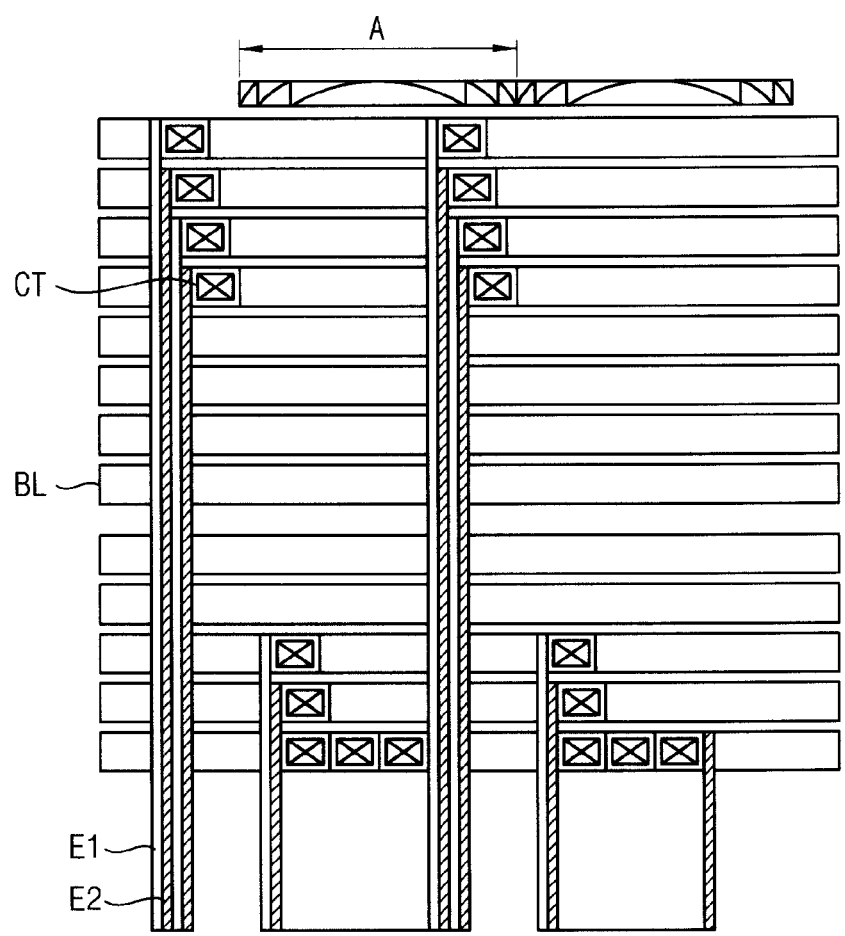
Figure 7:
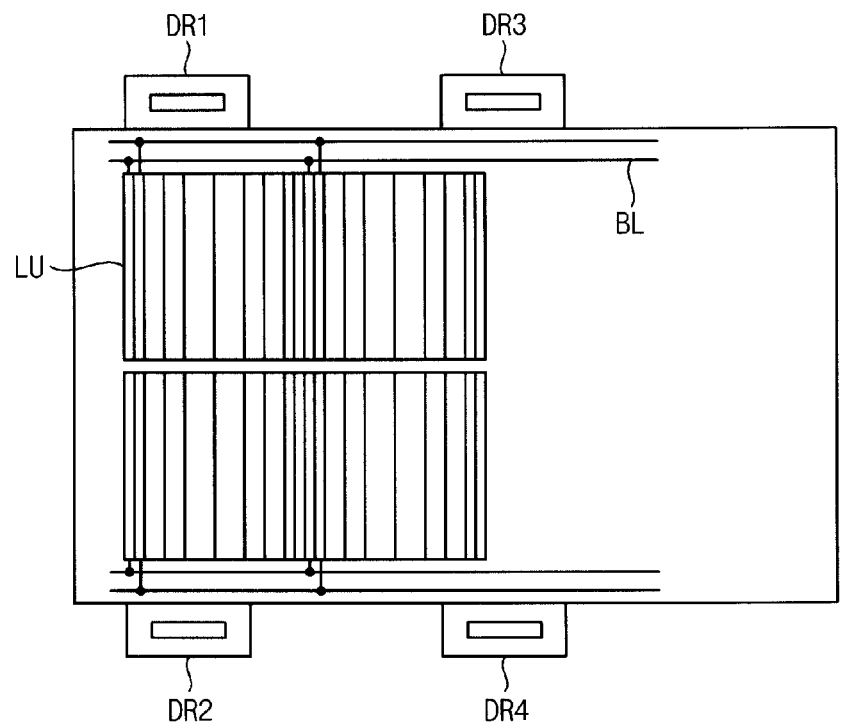

FIG. 4 is a cross-sectional view of an exemplary embodiment of the lens part in FIG. 2. FIGS. 5 to 7 are plan views illustrating wiring schemes of an exemplary embodiment of the lens part in FIG. 2.

Referring to FIG. 4, the lens part 300 includes a first substrate 340, a second substrate 380 and a liquid crystal layer 390. In FIG. 4, the lens units LU and a conceptual diagram of a refractive index distribution are also illustrated for convenience of explanation.

The first substrate 340 includes a first base substrate 301, a first insulation layer 310, first electrodes E1, a second insulation layer 320, second electrodes E2 and a first alignment layer 330. The first insulation layer 310 and the second insulation layer 320 may include a substantially identical material.

The first insulation layer 310 is disposed on the first base substrate 301. The first electrodes E1 are disposed in the first insulation layer 310. In the 3D mode, a voltage for driving the lens part as 300 the Fresnel lens is applied to each of the first electrodes E1.

The second insulation layer 320 is disposed on the first electrodes E1 on the first base substrate 301. The second electrodes E2 are disposed in the second insulation layer 320. In the 3D mode, a voltage for driving the lens part 300 as the Fresnel lens is applied to each of the second electrodes E2.

The first alignment layer 330 is disposed on the second insulation layer 320 on the first base substrate 301. The first alignment layer 330 has a first alignment direction to prevent an initial alignment from being twisted.

The second substrate 380 includes a second base substrate 351, a common electrode CE and a second alignment layer 370.

The common electrode CE is disposed on the second base substrate 351.

The second alignment layer 370 is disposed on the common electrode CE disposed on the second base substrate 351. The second alignment layer 370 has a second alignment direction to prevent an initial alignment from being twisted.

The liquid crystal layer 390 includes liquid crystal molecules. In an exemplary embodiment, the liquid crystal molecules are arranged in a planar alignment having an antiparallel structure or in homeotropic alignment.

When the driving voltage is applied to the lens part 300, the liquid crystal molecules are arranged to have a refractive index distribution corresponding to the refractive index distribution of the Fresnel lens.

In an exemplary embodiment, the electrodes are disposed in two layers, but not being limited thereto. In an alternative exemplary embodiment, the electrodes may be disposed in three or more layers.

Referring to FIGS. 5 and 6, the lens part 300 includes bus lines BL to which the driving voltage is applied, and contact portions CT electrically which connects the bus lines BL to the first electrodes E1 and the second electrodes E2.

In one exemplary embodiment, for example, the bus lines BL may extend along the first direction D1, and the first electrodes E1 and the second electrodes E2 may extend along the second direction D2. The first electrodes E1 and the second electrodes E2 are disposed on the bus lines BL. The first electrodes E1 and the second electrodes E2 are alternately disposed along the first direction D1.

The first electrodes E1 and the second electrodes E2 may be asymmetrically disposed in each of the lens units LU.

In an exemplary embodiment, as shown in FIG. 7, the bus lines BL may be disposed at upper portions and lower portions of the first electrodes E1 and the second electrodes E2. Each of the lens units LU may include upper lens units and lower lens units corresponding to the upper portion and the lower portion, respectively, and the upper and lower portions are independently driven. In such an embodiment, upper driving parts DR1 and DR3 that control the upper lens units, and lower driving parts DR2 and DR4 that control the lower lens units LU may be provided.

A wiring structure is not limited to exemplary embodiments illustrated in FIGS. 5 to 7. In an alternative exemplary embodiment, bus lines and a wiring of electrodes may be changed.

Figure 8:
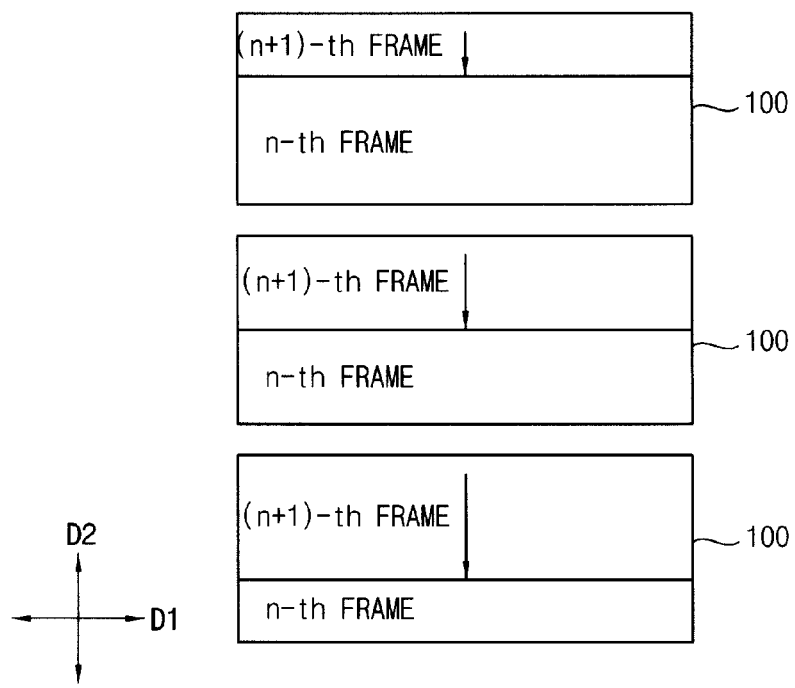
FIGS. 8 and 9 are conceptual diagrams illustrating a driving direction of exemplary embodiments of a light source and the panel in FIG. 2.
Figure 9:
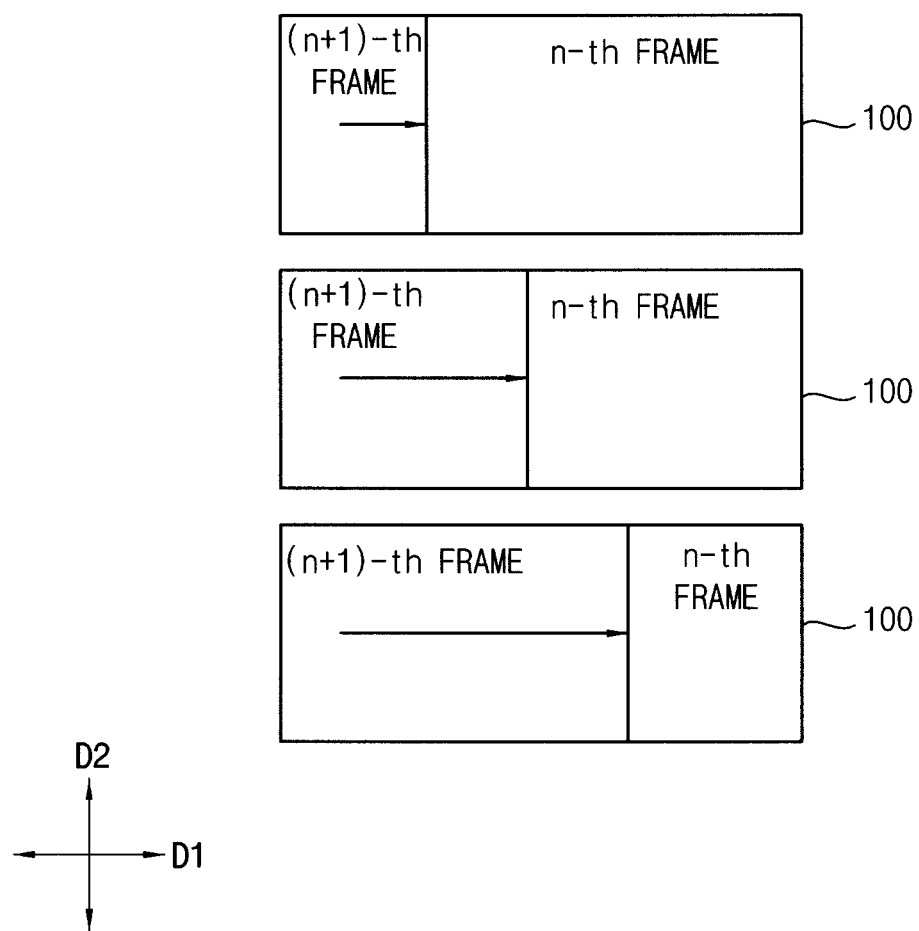

FIGS. 8 and 9 are conceptual diagrams illustrating a driving direction of exemplary embodiments of the light source and the panel in FIG. 2.

The light source 100 may include a plurality of blocks, and each of the blocks be driven. In one exemplary embodiment, for example, the light source 100 may be divided into 8 blocks.

Referring to FIG. 8, a driving direction of an exemplary embodiment of the light source 100 is illustrated, in which a gate line on the display panel 210 is disposed along the first direction D1. In such an embodiment, the light source 100 may include blocks arranged along the first direction D1. The blocks of the light source 100 may be synchronized with the gate line, and sequentially driven along the second direction D2.

Referring to FIG. 9, a driving direction of an alternative exemplary embodiment of the light source 100 is illustrated, in which the gate line on the display panel 210 is disposed along the second direction D2. In such an embodiment, the light source 100 may include blocks arranged along the second direction D2. The blocks of the light source 100 may be synchronized with the gate line, and sequentially driven along the first direction D1.

Figure 10:
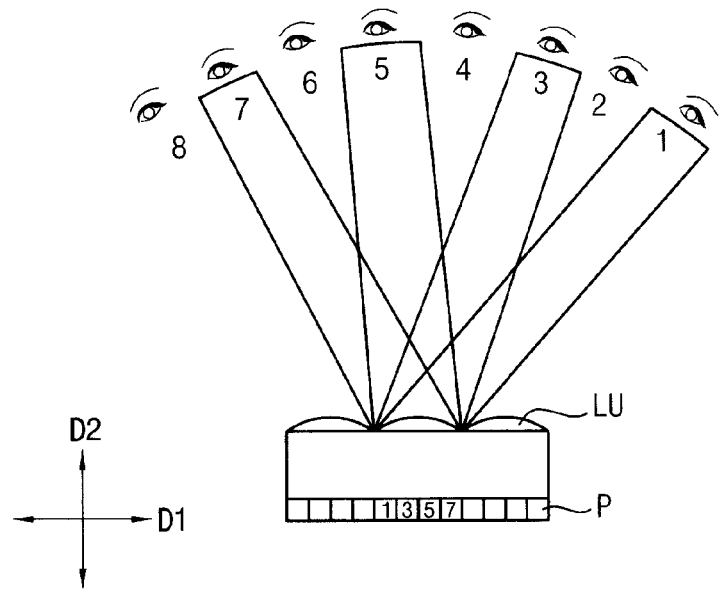
FIGS. 10 and 11 are conceptual diagrams illustrating an image perceived in each frame.
Figure 11:
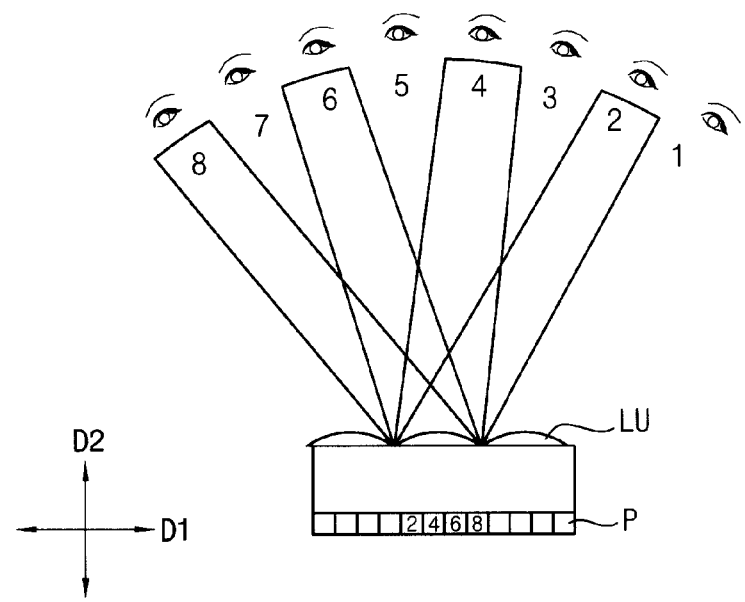
Figure 12:
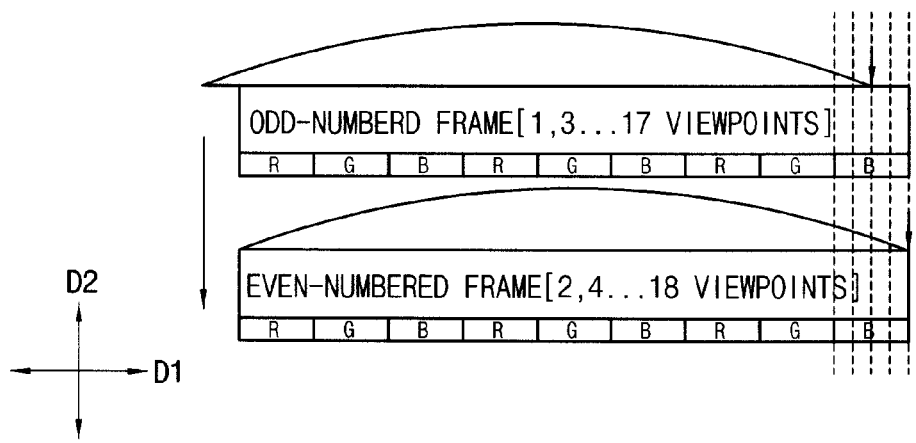
FIGS. 12 and 13 are conceptual diagrams illustrating changes in the panel and the lens in each frame.
Figure 13:
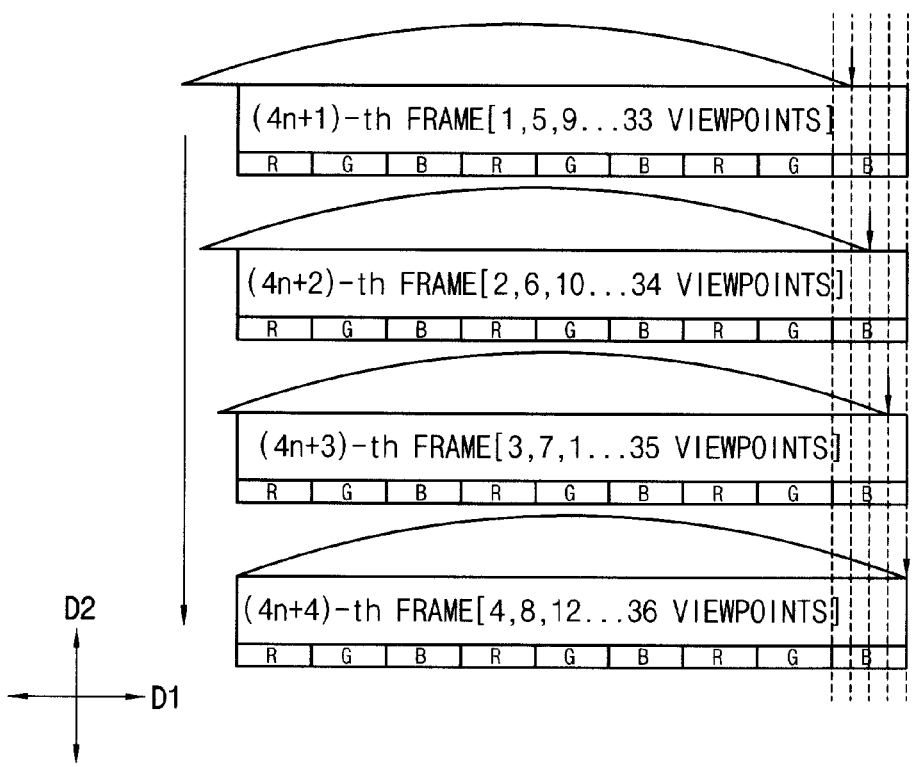

FIGS. 10 and 11 are conceptual diagrams illustrating an image perceived in each frame. FIGS. 12 and 13 are conceptual diagrams illustrating changes in the panel and the lens in each frame.

A focal point of the lens units LU and a viewpoint number of a 3D stereoscopic image displayed on the pixels P in an odd-numbered frame are shown in FIG. 10. A focal point of the lens units LU and a viewpoint number of a 3D stereoscopic image displayed on the pixels P in an even-numbered frame are shown in FIG. 11.

In an exemplary embodiment, the display apparatus displays 9 viewpoints, for example, and the viewpoints from right to left in an observer's view are defined as a first viewpoint to a nine-th viewpoint.

Referring to FIGS. 10 and 11, the pixels P display the 3D stereoscopic image having an odd-numbered viewpoint in the odd-numbered frame. The pixels P display the 3D stereoscopic image having an even-numbered viewpoint in the even-numbered frame.

Each of the pixels P displays the 3D stereoscopic image having a viewpoint different from the viewpoint of an adjacent pixel thereof. The pixels P adjacent to each other display the 3D stereoscopic images having different viewpoints per time.

A focal point of each of the pixels P is changed corresponding to the 3D stereoscopic image of the pixels P. In one exemplary embodiment, for example, the focal point shifts by a half of the pixel pitch along the first direction D1 in the even-numbered frame, with respect to the focal point of each of the pixels P in the odd-numbered frame.

In an exemplary embodiment, a first image having the odd-numbered viewpoint, a black image, a second image having the even-numbered viewpoint and a black image may be sequentially provided to the panel 200. In an alternative exemplary embodiment, a first image having the odd-numbered viewpoint, a second image having the odd-numbered viewpoint, a third image having the even-numbered viewpoint and a fourth image having the even-numbered viewpoint may be sequentially provided to the panel 200.

Exemplary embodiments of the display apparatus divides time and space by displaying the images having viewpoints different from each other based on the time and the position of the pixels P. Accordingly, exemplary embodiments of the display apparatus substantially improve a resolution and the number of viewpoints.

Referring to FIG. 12, when the display apparatus having 9 viewpoints is driven at a 2× speed, e.g., a speed twice a normal driving speed, 18 viewpoints may be displayed. In an exemplary embodiment, the normal driving speed may be a driving speed of the display apparatus when the display apparatus displays the 2D image.

The pixels P displays a 3D stereoscopic image having 1st, 3rd, . . . , 17th viewpoints in an odd-numbered frame. The pixels P displays a 3D stereoscopic image having 2nd, 4th, . . . , 18th viewpoints in an even-numbered frame.

In such an embodiment, each of focal points of the lens units is changed in the odd-numbered frame and the even-numbered frame.

As shown in FIG. 12, each of the focal points of the lens units in the even-numbered frame may shift by a half of the pixel pitch along the first direction D1 of the pixels P with respect to each of the focal points of the lens units in the odd-numbered frame.

Referring to FIG. 12, when the display apparatus having 9 viewpoints is driven at a 4× speed, e.g., at a speed four times the normal driving speed, 36 viewpoints may be displayed.

The pixels P displays a 3D stereoscopic image having 1st, 5th, 9th, . . . , 33rd viewpoints in a (4n+1)-th frame. The pixels P displays a 3D stereoscopic image having 2nd, 6th, 10th, . . . , 34th viewpoints in a (4n+2)-th frame. In addition, the pixels P displays a 3D stereoscopic image having 3rd, 7th, 11th, . . . , 35th viewpoints in a (4n+3)-th frame. The pixels P displays a 3D stereoscopic image having 4th, 8th, 12th, . . . , 36th viewpoints in a (4n+4)-th frame.

In such an embodiment, each of focal points of the lens units LU is changed in the (4n+1)-th, (4n+2)-th, (4n+3)-th and (4n+4)-th frames.

In one exemplary embodiment, for example, a displacement of each of the focal points of the lens units LU may be defined as $n \times p/N$. As shown in FIG. 13, each of the focal points of the lens units in the (4n+2)-th frame may shift by a quarter of a pixel pitch p along the first direction D1 of the pixels P with respect to each of the focal points of the lens units in the (4n+1)-th frame.

Similarly, each of the focal points of the lens units may shift by two quarters of a pixel pitch p along the first direction D1 in the (4n+3)-th frame with respect to each of the focal points of the lens units in the (4n+1)-th frame. Each of the focal points of the lens units may shift by three quarters of a pixel pitch p along the first direction D1 in the (4n+4)-th frame with respect to each of the focal points of the lens units in the (4n+1)-th frame.

When the number of viewpoints in the display apparatus is defined as M and a viewpoint number is defined as m, for an aspect of a space division, an (I×M+m)-th pixel displays an m-th viewpoint image. Herein, M and m are natural numbers, and I is an integer greater than or equal to zero.

When the display apparatus is driven at an N× speed, e.g., a speed N times the normal driving speed, and a frame number is defined as J, for an aspect of a time division, an (J×N+n)-th pixel displays a (N+n)-th viewpoint image. Herein, N and J are natural numbers, and n is an integer greater than or equal to zero and less than N.

An exemplary embodiment of the display apparatus is driven at the N× speed by dividing time and space, such that the number of viewpoint is increased by N times. Thus, a resolution may be increased by N times without increasing the number of pixels P.

Figure 14:
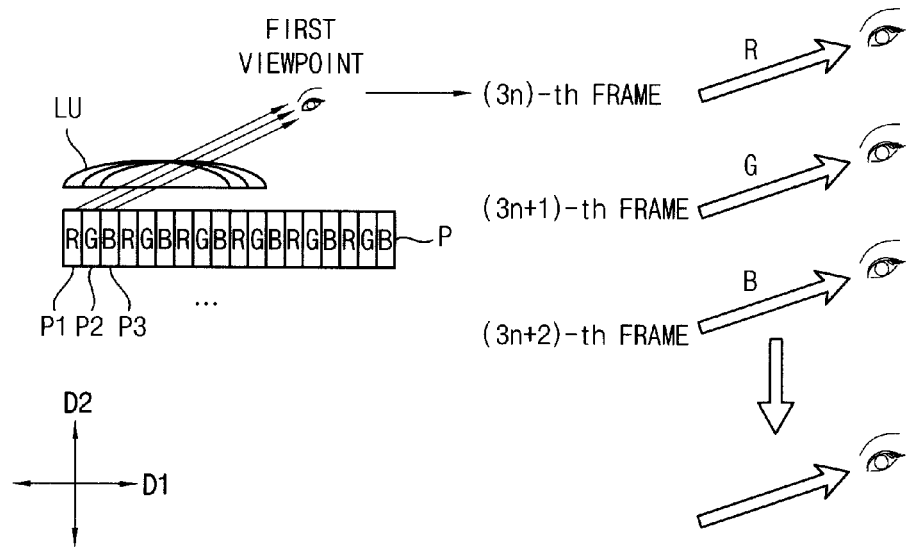
FIG. 14 is a conceptual diagram illustrating an image perceived in each frame of an alternative exemplary embodiment of a display apparatus according to the present invention.
Figure 15:
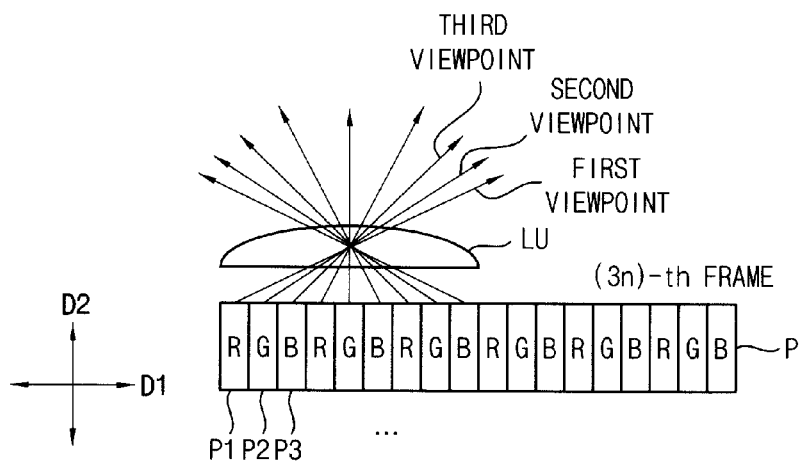
FIGS. 15 to 17 are conceptual diagrams illustrating changes in a panel and a lens part in each frame in the display apparatus of FIG. 14.
Figure 16:
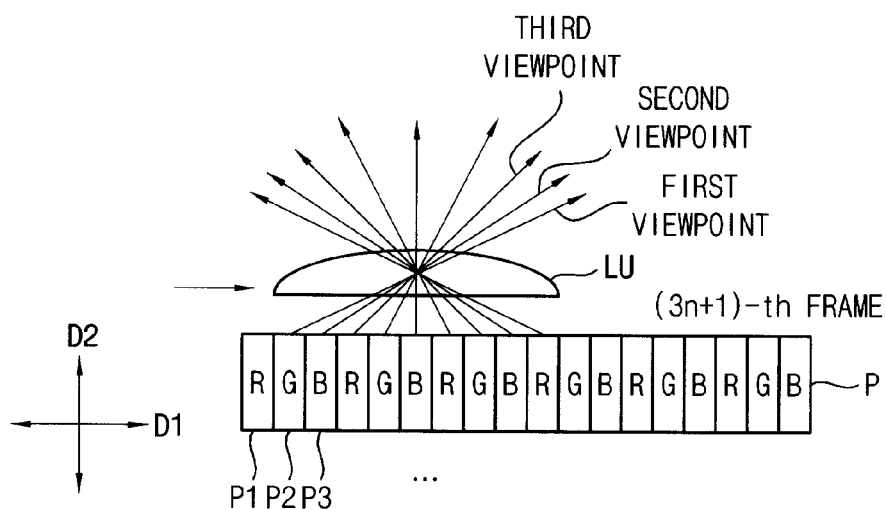
Figure 17:
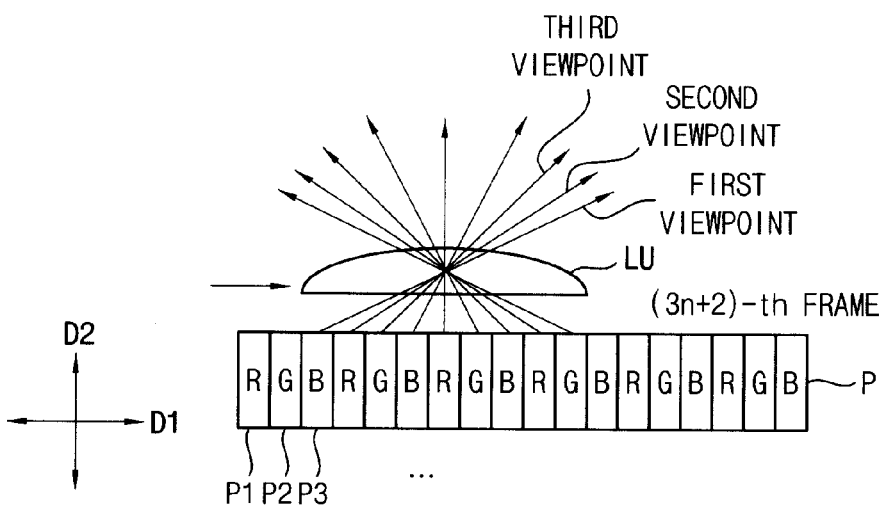
Figure 18:
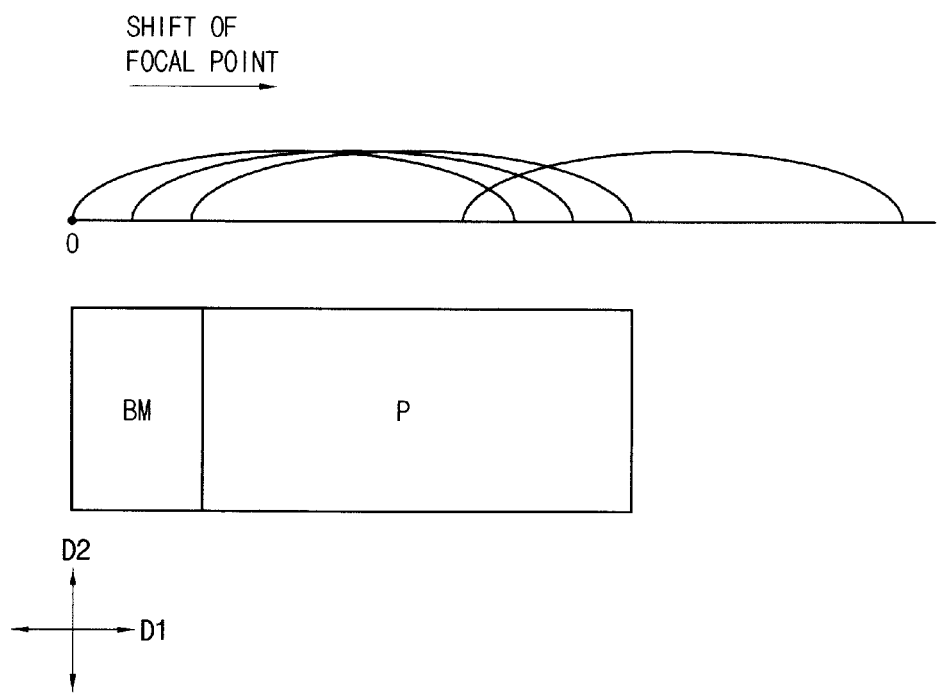
FIG. 18 is a conceptual diagram illustrating a shift of a focal point.
Figure 19:
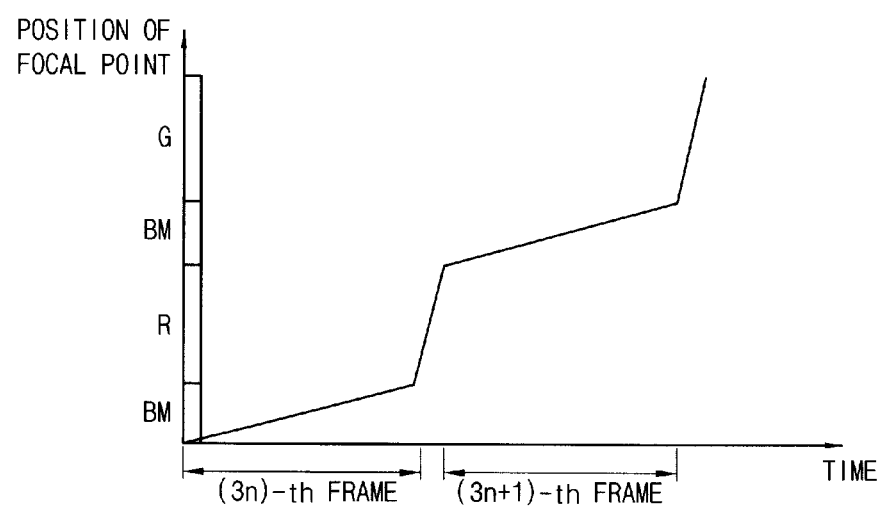
FIG. 19 is a conceptual diagram illustrating a moving speed of the focal point in FIG. 18.

FIG. 14 is a conceptual diagram illustrating an image perceived in each frame of an alternative exemplary embodiment of the display apparatus according to the present invention. FIGS. 15 to 17 are conceptual diagrams illustrating changes in a panel and a lens part in each frame of FIG. 14. FIG. 18 is a conceptual diagram illustrating a shift of a focal point. FIG. 19 is a conceptual diagram illustrating a moving speed of the focal point in FIG. 18.

The display apparatus in FIG. 14 is substantially the same as the display apparatus in FIG. 1, except that the display apparatus in FIG. 14 is driven at a 3× speed. Thus, any repetitive detailed descriptions of the same or like elements will be omitted or simplified.

As shown in FIG. 14, in an exemplary embodiment, the display apparatus may display 9 viewpoints. In addition, red R, green G and blue B pixels P are sequentially arranged along the first direction D1. The three pixels from left to right in an observer's view are defined as a first pixel P1, a second pixel P2 and a third pixel P3, respectively. Hereinafter, a first viewpoint and one lens unit will be described for convenience of explanation.

Referring to FIG. 14, in the first viewpoint, each of the pixels P displays an image having viewpoints different from each other in each frame, and each of the lens units LU have focal points different from each other in each frame.

In one exemplary embodiment, for example, as shown in FIG. 15, the first pixel P1 displays a 3D stereoscopic image having the first viewpoint in a 3n-th frame.

As shown in FIG. 16, the second pixel P2 displays a 3D stereoscopic image having the first viewpoint in a (3n+1)-th frame. Each of the focal points of the lens units LU may shift by a pixel pitch p along the first direction D1, with respect to each of focal points of the lenses in the 3n-th frame.

Similarly, as shown in FIG. 17, the third pixel P3 displays a 3D stereoscopic image having the first viewpoint in a (3n+2)-th frame. Each of the focal points of the lens units may shift by a pixel pitch p along the first direction D1, with respect to each of focal points of the lenses in the (3n+1)-th frame.

In continuous frames, e.g., 3n-th, (3n+1)-th and (3n+2)-th frames, the first pixel P1, the second pixel P2 and the third pixel P3 displaying red, green and blue colors, respectively, and sequentially display a 3D stereoscopic image having the first viewpoint. In an exemplary embodiment, a focal point of the lens unit LU also shifts.

Although not shown in figures, a blocking pattern is disposed between the pixels P. A moiré effect may occur in a specific viewpoint due to the blocking pattern. In one exemplary embodiment, for example, a focal point of the lens unit LU may be shifted as width of the blocking pattern in each specific period to reduce the moiré effect. In an alternative exemplary embodiment, the lens unit may be vibrated for dithering in each frame to reduce the moiré effect.

In an exemplary embodiment, as shown in FIGS. 18 and 19, a focal point of the lens unit moves slowly at width corresponding to the blocking pattern in one frame, and moves quickly at width corresponding to the pixel in one frame, to reduce the moiré effect.

In exemplary embodiments, three frames and three pixels P display one color, and thus a resolution of the display apparatus increases by three times without increasing the number of the pixels. In addition, a distance between the panel 200 and the lens part 300 may be decreased by a third due to the increased resolution, and thus, thickness of the display apparatus may be decreased.

In an exemplary embodiment, the pixels P that display red, green and blue colors may be sequentially and repeatedly arranged along the first direction D1. In an alternative exemplary embodiment, the pixels P that display red, green and blue colors may be sequentially and repeatedly arranged along the second direction D2.

However, the pixels P may be arranged in various patterns. In one exemplary embodiment, for example, the pixels P that display red, green, blue and green colors may be sequentially and repeatedly arranged along the first direction D1. The pixels P that display the red, green, blue and white colors may be sequentially and repeatedly arranged along the first direction D1.

In an exemplary embodiment, the pixels P may be arranged in a matrix shape. In an alternative exemplary embodiment, the total sum of lengths of the second sides of the pixels P may be substantially the same as a length of a side of the display panel 210 substantially parallel to the second direction, and the pixels P may be arranged in a stripe shape along the second direction D2.

In an exemplary embodiment, an axis of the lens units LU is parallel to the second direction D2. In an alternative exemplary embodiment, the axis of the lens units LU may be inclined with respect to the second direction D2.

According to exemplary embodiments as described herein, the display apparatus has substantially the same effect as a color-sequence-driving display apparatus, and thus moiré effect and crosstalk, for example, are effectively prevented to enhance display quality.

As described herein, exemplary embodiments of the display apparatus increases viewpoints by dividing time and space. Therefore, a resolution may be increased without increasing pixels. In addition, a shifting speed of a focal point of a lens unit is controlled, such that moiré effect and crosstalk, for example, may be effectively prevented to enhance display quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display apparatus comprising:
    a controller which generates a control signal based on at least one of a two-dimensional image and a three-dimensional stereoscopic image inputted from an outside;
    a panel comprising a plurality of pixels, wherein the plurality of pixels is arranged along a first direction and along a second direction substantially perpendicular to the first direction, and displays the three-dimensional stereoscopic image having a plurality of viewpoints different from each other in each frame;
    a lens part comprising a plurality of lens units, wherein the plurality of lens units is disposed over the panel overlapping the pixels along the first direction and having a plurality of focal points which shifts in each frame; and
    a light source which supplies light to the panel,
    wherein when the display apparatus is driven at a speed N times a normal driving speed,
    each of the plurality of pixels displays an image having an (N+n)-numbered viewpoint in a(J×N+n)-th frame, wherein N is a natural number, J is a frame-number of the three-dimensional stereoscopic image, and n is an integer greater than or equal to zero and less than N, and
    each of the plurality of focal points of the plurality of lens units shifts by p/N in each frame, wherein p is a pixel pitch.

2. The display apparatus of claim 1, wherein each of the plurality of focal points of the plurality of lens units shifts along the first direction by a same distance in each frame.

3. The display apparatus of claim 1, wherein adjacent pixels of the plurality of pixels display the three-dimensional stereoscopic images having the viewpoints different from each other.

4. The display apparatus of claim 1, wherein when the display apparatus is driven at a speed twice a normal driving speed,
    each of the plurality of pixels displays an image having an odd-numbered viewpoint in an odd-numbered frame, and displays an image having an even-numbered viewpoint in an even-numbered frame, and
    each of the plurality of focal points of the plurality of lens units in the even-numbered frame shifts by a half of a pixel pitch with respect to each of the plurality of focal points of the plurality of lens units in the odd-numbered frame.

5. The display apparatus of claim 4, wherein the controller sequentially provides a first image having the odd-numbered viewpoint, a second image having the odd-numbered viewpoint, a third image having the even-numbered viewpoint and a fourth image having the even-numbered viewpoint to the panel.

6. The display apparatus of claim 4, wherein the controller sequentially provides a first image having the odd-numbered viewpoint, a black image, a second image having the even-numbered viewpoint and a black image to the panel.

7. The display apparatus of claim 1, wherein when the display apparatus is driven at a speed three times a normal driving speed,
    the plurality of pixels comprises a red pixel, a green pixel and a blue pixel,
    the red, green and blue pixels are alternately and repeatedly arranged,
    the red, green and blue pixels are disposed adjacent to each other and sequentially display an image having substantially identical viewpoint to each other in each frame, and
    each of the plurality of focal points of the plurality of lens units shifts by one pixel pitch in each frame at a first speed.

8. The display apparatus of claim 7, wherein the panel further comprises a blocking pattern disposed between the plurality of pixels, and
    each of the plurality of focal points of the plurality of lens units further shifts by a width of the blocking pattern along the first direction.

9. The display apparatus of claim 8, wherein each of the plurality of focal points of the plurality of lens units shifts by the width of the blocking pattern at a second speed less than the first speed.

10. The display apparatus of claim 7, wherein the panel further comprises a blocking pattern disposed between the plurality of pixels, and each of the plurality of lens units vibrates in each frame.

11. The display apparatus of claim 1, wherein the controller comprises:
   a lens controller which provides a lens driving signal to the lens part, wherein the lens driving signal shifts the plurality of focal points of the plurality of lens units;
   a panel controller which provides a panel driving signal to the panel, wherein an image is displayed based on the panel driving signal; and
   a light source controller which provides a light source driving signal to the light source, wherein the light source driving signal increases brightness of the light source when the three-dimensional stereoscopic image is displayed.

12. The display apparatus of claim 11, wherein the lens controller comprises:
   a first lens controller which provides the lens driving signal to an upper portion of the plurality of lens units; and
   a second lens controller which provides the lens driving signal to a lower portion of the plurality of lens units.

13. The display apparatus of claim 1, wherein the lens part comprises:
   a first substrate comprising a plurality of electrodes, wherein a driving voltage is applied to the plurality of electrodes such that the plurality of lens units has a refractive index distribution corresponding to a refractive index distribution of a Fresnel lens type;
   a second substrate comprising a common electrode disposed opposite to the plurality of electrodes; and
   a liquid crystal layer disposed between the first substrate and the second substrate.

14. The display apparatus of claim 13, wherein the plurality of electrodes comprises:
   a first electrode disposed on the first substrate; and
   a second electrode disposed on the first electrode,
   wherein the first electrode and the second electrode are alternately arranged.

15. The display apparatus of claim 14, wherein the driving voltage is asymmetrically applied to the first electrode and the second electrode.

16. The display apparatus of claim 1, wherein
   the panel has a first side extending along the first direction and a second side extending along the second direction, wherein a length of the first side is greater than a length of the second side, and
   the plurality of lens units is arranged along the first direction such that a longitudinal direction thereof is substantially parallel to the second side of the panel, or such that the longitudinal direction thereof arranged to form an inclined angle with respect to the second side of the panel.

17. The display apparatus of claim 1, wherein each of the plurality of pixels has a first side extending along the first direction and a second side extending along the second direction, and
   a length of the first side is less than a length of the second side.

18. The display apparatus of claim 17, wherein a total sum of a length of the second side of the plurality of pixels is substantially the same as a length of a side of the panel which extends along the second direction.

19. The display apparatus of claim 17, wherein the plurality of pixels is arranged in a matrix shape.

20. The display apparatus of claim 1, wherein the panel comprises a gate line extending along the first direction, and
   the light source includes a plurality of block units arranged along the first direction.

21. The display apparatus of claim 1, wherein the panel comprises a gate line extending along the second direction, and
   the light source includes a plurality of block units arranged along the second direction.

22. A display apparatus comprising:
   a controller which generates a control signal based on at least one of a two-dimensional image and a three-dimensional stereoscopic image inputted from an outside;
   a panel comprising a plurality of pixels, wherein the plurality of pixels is arranged along a first direction and along a second direction substantially perpendicular to the first direction, and displays the three-dimensional stereoscopic image having a plurality of viewpoints different from each other in each frame;
   a lens part comprising a plurality of lens units, wherein the plurality of lens units is disposed over the panel overlapping the pixels along the first direction and having a plurality of focal points which shifts in each frame; and
   a light source which supplies light to the panel,
   wherein when the display apparatus is driven at a speed twice a normal driving speed,
   each of the plurality of pixels displays an image having an odd-numbered viewpoint in an odd-numbered frame, and displays an image having an even-numbered viewpoint in an even-numbered frame, and
   each of the plurality of focal points of the plurality of lens units in the even-numbered frame shifts by a half of a pixel pitch with respect to each of the plurality of focal points of the plurality of lens units in the odd-numbered frame.

* * * * *